Aug. 16, 1955 M. RISTILA ET AL 2,715,543
CANE TYPE WEED PULLER
Filed Aug. 11, 1952 2 Sheets-Sheet 2
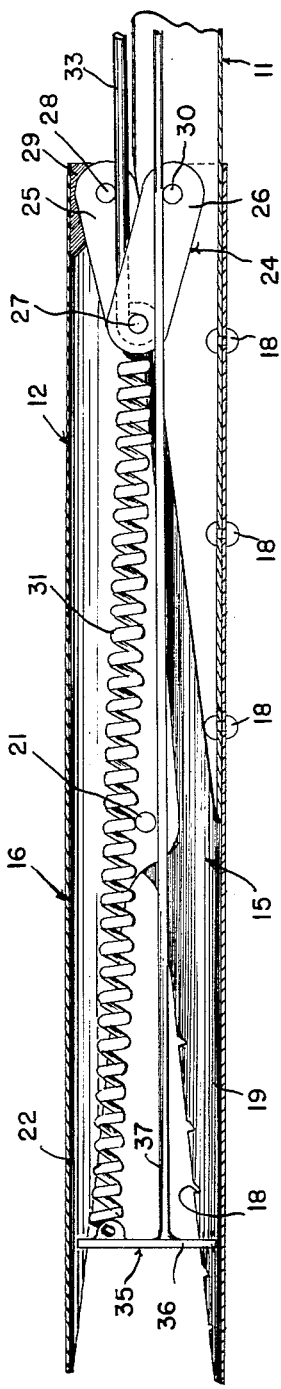
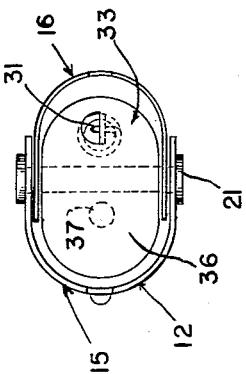
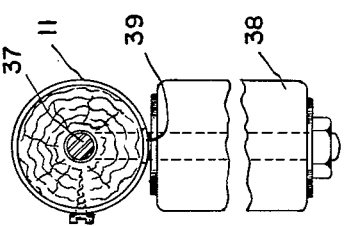
INVENTORS
MATT RISTILA
JOHN A. OVERHOUSE
BY
ATTORNEYS 2,715,543

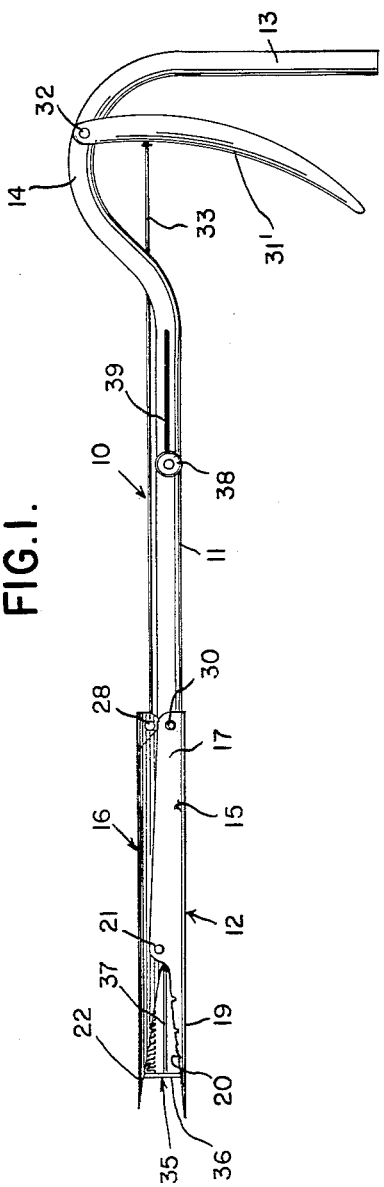
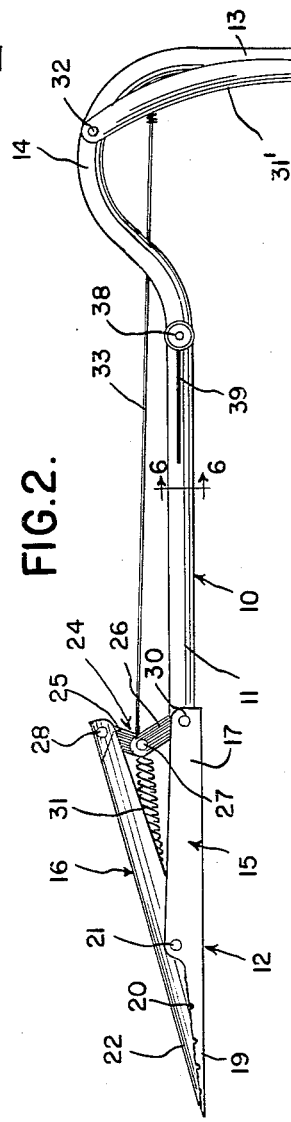
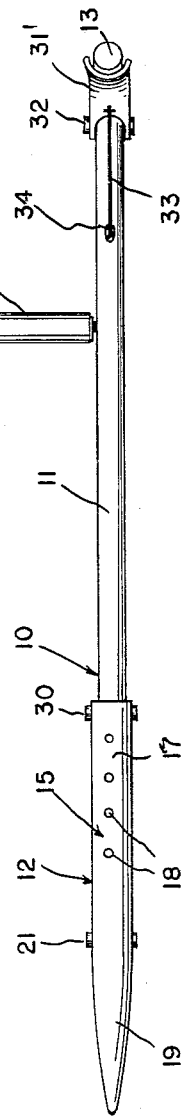

CANE TYPE WEED PULLER

Matt Ristila and John A. Overhouse, Lansing, Mich.

Application August 11, 1952, Serial No. 303,678

8 Claims. (Cl. 294—50.9)

This invention relates generally to garden tools and refers more particularly to improvements in weed pullers.

It is an object of this invention to provide a weed puller of the cane type having relatively movable gripping jaws fashioned with soil piercing blades and having toggle linkage for relatively moving the jaws into gripping relationship.

It is another object of this invention to combine with the toggle linkage leverage means which affords an exceptionally high mechanical advantage in favor of relatively moving the jaws toward one another.

It is still another object of this invention to provide an ejector part supported between the jaws for movement lengthwise of the latter and connected to the toggle by a coil spring in a manner such that said spring not only serves to bias the jaws to their open position but in addition urges the ejector to its uppermost or inoperative position.

It is a further object of this invention to provide manually operable controls respectively supported on the staff of the weeder for convenient manipulation by the operator to selectively actuate the jaw operating toggle and the ejector.

It is a still further object of this invention to provide a weeder of the type noted above composed of relatively few simple parts capable of being inexpensively manufactured and assembled.

The foregoing as well as other objects will be made more apparent as this description proceeds especially when considered in connection with the accompanying drawings wherein:

Figure 1 is a side elevational view of a weed puller embodying the features of this invention;

Figure 2 is an elevational view similar to Figure 1 and showing the parts in different positions;

Figure 3 is a plan view of the weed puller shown in Figure 2;

Figure 4 is an enlarged fragmentary sectional view of the lower end of the weed puller and showing the jaws in their relative open position;

Figure 5 is a bottom end elevational view of the weed puller shown in Figure 4; and Figure 6 is a cross sectional view taken on the line 6—6 of Figure 2.

Referring now more in detail to the drawings, it will be noted that the numeral 10 designates a cane type weed puller comprising a staff 11, and gripping jaws 12. In the present instance, the staff 11 is in the form of an elongated tube having a straight section of suitable length and having a part at the top bent laterally to form a handle 13. The handle 13 extends rearwardly from the staff 11 at right angles to the straight section thereof, and is integrally joined to the upper end of the straight section by a forwardly offset arcuate section 14. The jaws 12 comprise a fixed jaw 15 and a movable jaw 16. The fixed jaw 15 is arcuate in cross section and has a portion 17 at the upper end shaped to receive the lower end of the staff 11. The arcuate portion 17 is permanently secured to the staff 11 by rivets 18 or by some other equivalent fastening means. The lower end of the jaw 15 is tapered in a manner to provide a soil piercing blade 19 which may be provided with suitable notches 20 in the side edges thereof in order to facilitate the gripping action of the jaws when in their relative closed position.

The cooperating movable jaw 16 is also arcuate in cross section and is of a dimension to fit within the jaw 15 as clearly shown in Figure 5 of the drawings. The two jaws 15 and 16 are pivotally connected intermediate the ends thereof by a pin 21 and the lower end of the jaw 16 is tapered to provide a soil piercing blade 22. As shown in Figure 2 of the drawings the blade portion 22 of the jaw 16 fits into the blade portion 19 of the jaw 15 and coacts with the latter to effectively grip a weed therebetween when the jaws are in their closed position. The notches 20 in the edges of the blade portion 19 assist in holding the weed between the jaws while the latter are retracted from the soil.

The jaw 16 is moved relative to the jaw 15 by a toggle 24 comprising links 25 and 26 having the inner ends pivotally connected together by a pin 27. The toggle 24 is located between the upper ends of the jaws and the outer end of the link 25 is pivoted by a pin 28 to a lug 29 fixed to the upper end of the jaw 16. The outer end of the link 26 is pivoted to the staff 11 by a pin 30 which extends through the staff 11 and the upper end of the jaw 15.

The toggle 24 is normally biased to its folded position shown in Figure 4 of the drawings by a coil spring 31 to be more fully hereinafter described and when the toggle is in its folded position the blade portion 22 of the movable jaw 16 is spaced laterally from the blade portion 19 of the fixed jaw 15. The construction is such that movement of the toggle 24 in a direction toward its extended position swings the jaw 16 about the pin 27 in a direction to move the blade portion 22 of the jaw 16 into gripping relationship with the blade portion 19 of the jaw 15. The toggle 24 is moved in a direction toward its extended position by a lever 31' positioned directly beneath the handle 13 and having the outer end pivoted to the arcuate section 14 of the staff 11 by a pin 32. A connecting rod 33 is secured to the lever 31' intermediate the ends thereof and projects downwardly through a clearance opening 34 formed in the arcuate section 14 of the staff 11. The lower end of the rod 33 is shown in Figure 4 of the drawings as connected to the pivot pin 27 of the toggle 24. The construction is such that movement of the lever 31' upwardly against the lower side of the handle 13 imparts a movement to the rod 33 in an upward direction with the result that the toggle 24 is in turn moved toward its extended position shown in Figure 2 of the drawings. Attention is called to the fact that the upper end of the rod 33 is connected to the lever 31' in relatively close proximity to the pivot pin 32 so that a substantial mechanical advantage in favor of the operator is provided for actuating the toggle 24. Also, it will be noted that the distance between the axis of the pivot pin 21 for the jaws and the pin 28 is substantially greater than the length of the gripping blade 22 of the jaw 16 and this arrangement provides for obtaining a substantial gripping action between the jaws with the application of a minimum amount of force on the part of the operator.

Provision is made herein for ejecting the weed after it is withdrawn from the soil and this is accomplished by an ejector designated generally in Figures 1 and 4 by the numeral 35. The ejector comprises a plate 36 and a rod 37. The plate 36 is located between the gripping blades of the jaws below the pivot pin 21 and is connected to the bottom of the rod 37. The rod 37 extends upwardly through the staff 11 and is connected to an actuator in the form of a handle 38 extending laterally outwardly from one side of the staff 11 adjacent the handle 13. The inner end of the handle 38 projects through an elongated slot 39 formed in the staff 11 and is connected to the upper end of the rod 37 for actuating the latter.

The ejector is normally positioned between the jaws adjacent the pin 21 so as not to interfere with pivotal movement of the jaw 16 and is biased to this position by the spring 31. As shown in Figure 4 the upper end of the spring 31 is secured to the pin 27 of the toggle 24 and the lower end of the spring 31 is connected to the ejector plate 36. Thus the spring 31 performs the dual function of biasing the toggle 24 to its folded position wherein the gripping blades of the jaws are spaced from one another, and in addition yieldably maintains the ejector plate 36 in its uppermost or inoperative position adjacent the under side of the pivot pin 21.

In use the gripping blades at the lower ends of the jaws are placed at opposite sides of a weed to be extracted from the soil and sufficient downward pressure is applied to the staff 11 to force the blades into the soil. Upon completion of this operation the lever 31' is moved from the position shown in Figure 1 to the position shown in Figure 2 and hence the toggle 24 is moved by the rod 31' toward the extended position shown in Figure 2. As a result the jaw 16 is swung about the axis of the pin 21 to move the blade 22 toward the blade 19 on the jaw 15 and thereby effectively grip the weed between the blades. After the weed is gripped between the blades of the jaws the staff is raised by the operator to withdraw the jaws as well as the weed from the soil. The lever 31' is then released by the operator and the ejector 35 is operated by merely moving the handle 38 downwardly relative to the staff 11. This action causes the plate 36 to eject the weed from its position between the gripping blades of the jaws and at the same time separates the jaws by moving the toggle 24 to its folded position shown in Figure 4 of the drawings.

Owing to the structure of the weed puller, previously described, it will be noted that the latter may be readily operated with a minimum amount of effort on the part of the user to extract weeds together with their roots from the soil. It will also be noted that the gripping action of the jaws is exceptionally positive and enables using the device for the purpose of depositing poison pellets in mole runways or in other inaccessible places.

What we claim as our invention is:

1. A weed puller comprising a staff having a handle at the upper end, a fixed jaw at the lower end of the staff and having a ground piercing blade, a cooperating jaw pivotally supported intermediate the ends thereof by the staff and having a ground piercing blade movable toward and away from the blade on the fixed jaw, a toggle comprising a pair of links having the inner ends pivotally connected together and having the outer ends respectively pivotally supported on the movable jaw and staff at points spaced above the pivotal support for the movable jaw, means for biasing the toggle toward its folded position wherein the blades on said jaws are spaced apart, means positioned adjacent the handle on said staff and connected to the toggle for moving the toggle linkage toward its extended position and thereby swing the blade on the movable jaw toward the blade on the fixed jaw, an ejector supported on the staff between the blades and movable lengthwise of said blades in the open position of the jaws, said ejector comprising a plate movable lengthwise of the blades between the pivotal mounting for the movable blade and the lower ends of said blades, and an actuator supported on the staff adjacent the upper end thereof and connected to the ejector plate, the means for biasing the toggle linkage comprising a spring having one end connected to the inner ends of the toggle links and having the other end connected to the ejector plate for also biasing said plate to its uppermost position relative to the blades.

2. A weed puller comprising a tubular staff having a handle at the upper end, a fixed jaw at the lower end of the staff and having a ground piercing blade, a cooperating jaw pivotally supported intermediate the ends thereof by the staff and having a ground piercing blade movable toward and away from the blade on the fixed jaw, a toggle comprising a pair of links having the inner ends pivotally connected together and having the outer ends respectively pivotally supported on the movable jaw and staff at points spaced above the pivotal support for the movable jaw, means for biasing the toggle toward its folded position wherein the blades on said jaws are spaced apart, means positioned adjacent the handle on said staff and connected to the toggle for moving the toggle linkage toward its extended position and thereby swing the blade on the movable jaw toward the blade on the fixed jaw, an ejector supported on the staff between the blades and movable lengthwise of said blades in the open position of the jaws, said ejector comprising a plate movable lengthwise of the blades between the pivotal mounting for the movable blade and the lower ends of said blades, an actuator supported on the staff adjacent the upper end thereof, means interconnecting said actuator and plate comprising a rod extending upwardly from the plate through the staff, said actuator comprising a handle having a part extending through an elongated slot in one side of the staff and connected to the upper end of the rod, and the biasing means for the toggle linkage comprising a coil spring positioned between the jaws and having the opposite ends respectively connected to the ejector plate and the inner ends of the toggle links.

3. A weed puller comprising a staff having a handle at the upper end, a first jaw at the lower end of the staff and having a ground piercing blade, a second jaw having a ground piercing blade coacting with the blade of the first jaw, means pivotally supporting the second jaw intermediate the ends thereof on the staff, a toggle comprising a first link having the outer end pivoted to the second jaw adjacent the upper end thereof, a second link having the inner end pivoted to the inner end of the first link and having the outer end pivotally supported by the staff, means for biasing the toggle toward its folded position wherein the blades are spaced apart, means positioned adjacent the handle on the staff and connected to the toggle for moving the toggle links toward their extended position and thereby relatively move the jaws toward their closed position, and an ejector positioned between the jaw blades and movable lengthwise of the blades between the lower ends of the latter and pivotal support for the second jaw, said biasing means comprising a coil spring positioned between the jaws and having the opposite ends respectively connected to the ejector and the inner ends of the toggle links.

4. The weed puller defined in claim 3 having an actuator supported on the staff for convenient manipulation and connected to said ejector for moving the latter downwardly against the action of said spring.

5. A weed puller comprising a staff having a handle at the upper end, a first jaw at the lower end of said staff and having a ground piercing blade, a second jaw having a ground piercing blade coacting with the blade of the first jaw, means pivotally supporting the second jaw intermediate the ends thereof on said staff, linkage interconnecting said staff and the upper end portion of said second jaw, said linkage being movable from a first position wherein the blades are spaced apart to a second position wherein the blades are moved together into gripping relation, means for moving said linkage between its first and second positions, an ejector positioned between the jaw blades and movable lengthwise of the blades between the lower ends of the latter and the pivotal support for the second jaw, and means for biasing said linkage to its first position comprising a spring having one end connected to said linkage and having the other end connected to said ejector for also biasing the latter to its uppermost position relative to said blades.

6. The weed puller defined in claim 5 wherein the means for moving the linkage comprises a lever supported on said staff adjacent the handle, and a linear member interconnecting said lever and linkage.

7. The weed puller defined in claim 5, including an actuator supported on the staff adjacent the upper end thereof and connected to said ejector.

8. A weed puller comprising a staff, a pair of cooperating jaws supported at one end of said staff, each jaw having a ground piercing blade at the outer end, means pivotally connecting said jaws together for relative movement of the blades toward and away from each other, means for relatively moving said jaws about the pivotal connection, an ejector positioned between the jaw blades and movable between the outer ends of the blades and the pivotal connection, means for biasing said jaws toward a position wherein said blades are spaced apart comprising a spring, and means connecting one end of said spring to at least one of said jaws, the other end of said spring being connected to said ejector for also biasing the latter to a position adjacent said pivotal connection, and an actuator supported on the staff and connected to said ejector.

References Cited in the file of this patent

UNITED STATES PATENTS

| 1,860,963 | Smith | May 31, 1932 |
| 2,132,795 | Minier | Oct. 11, 1938 |